United States Patent [19]

France et al.

[11] 3,922,686
[45] Nov. 25, 1975

[54] ELECTROCARDIOGRAPHIC RECORDING APPARATUS

[75] Inventors: Larry R. France, Ossining; John G. Sherman, Yonkers, both of N.Y.

[73] Assignee: Kent Cambridge Instrument Co., Ossining, N.Y.

[22] Filed: Feb. 6, 1974

[21] Appl. No.: 439,908

[52] U.S. Cl. ........ 346/33 ME; 128/2.06 G; 346/23; 346/49
[51] Int. Cl. .......................... A61b 5/04; G01d 5/25
[58] Field of Search .................. 346/23, 33 ME, 49; 128/2.06 G, 2.06 R

[56] References Cited
UNITED STATES PATENTS

| | | |
|---|---|---|
| 2,627,267 | 2/1953 | Marchand ........................ 128/2.06 |
| 3,434,151 | 3/1969 | Bader et al. ............... 346/33 ME X |

*Primary Examiner*—Joseph W. Hartary
*Attorney, Agent, or Firm*—Eugene E. Geoffrey, Jr.

[57] ABSTRACT

Recording apparatus for electrocardiographic and other signals which embodies a plurality of recording channels for simultaneously recording sets of lead groups manually, semi-automatically and automatically and including logic circuits for inactivating the recorders during lead switching operations and applying calibrating pulses, event markers, time markers and markers identifying the lead groups being recorded.

13 Claims, 2 Drawing Figures

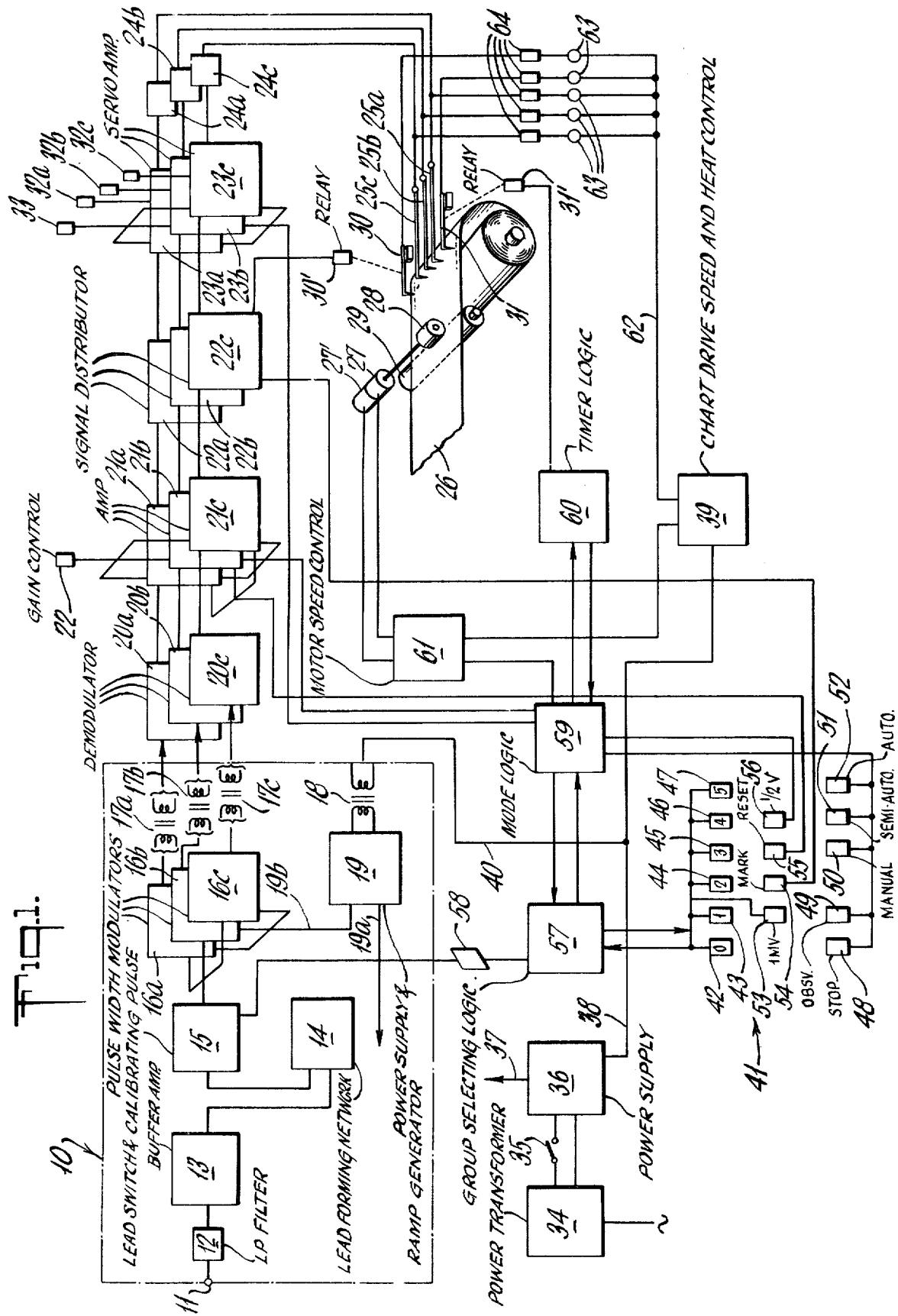

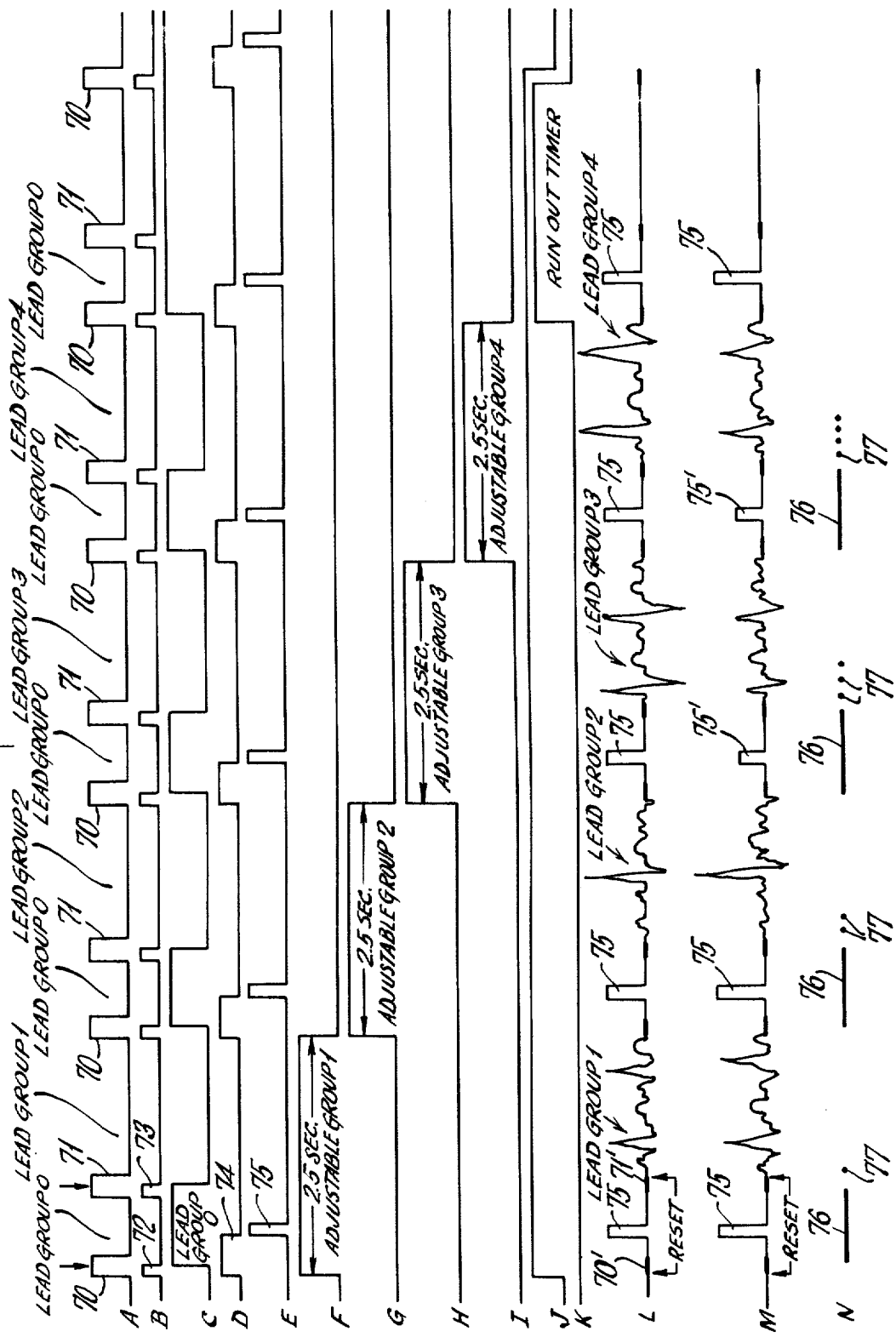

ELECTROCARDIOGRAPHIC RECORDING APPARATUS

This invention relates to recording apparatus and more specifically to a novel and improved multi-channel direct writing recorder for electrocardiographic signals and which may also be used for recording heart sound and pulse wave signals.

Many types of recorders for recording both electric and pressure signals produced by the heart have been suggested but known devices have not provided the versatility desirable in order to insure the production of useful records within a minimum length of time. Another difficulty heretofore experienced has been the isolation of the patient from the electrical power supply to prevent harm to the patient and at the same time avoid the generation of spurious signals that may adversely affect the recording.

This invention overcomes the foregoing difficulties and provides a novel and improved recorder particularly useful for recording electrocardiographic signals successively and automatically or manually from a plurality of lead groups. Means are also provided for semi-automatic operation wherein successive groups of leads can be recorded for predetermined time periods under manual control so that each group can be recorded during periods that the patient is at ease thus insuring the production of useable records.

Another object of the invention resides in the provision of a novel and improved recorder for electrocardiographic and other signals wherein a plurality of groups of signals may be successively recorded and wherein automatic marking means are provided to facilitate identification of each group of signals and for indicating speed of record.

Still another object of the invention resides in the provision of an electrocardiographic recorder embodying an improved arrangement and organization of elements for processing and recording groups of signals.

The above and other objects and advantages of the invention will become more apparent from the following description and accompanying drawings forming part of this application.

IN THE DRAWINGS

FIG. 1 is a block diagram of recording apparatus in accordance with the invention, and FIG. 2 is a graph illustrating certain aspects of the operation of the apparatus of FIG. 1.

The apparatus in accordance with the invention is illustrated in FIG. 1 and is intended, in electrocariographic applications, to operate with either the standard 12 lead system or the 16 lead orthagonal system. For the purposes of this description the standard 12 lead system will be utilized as an example and it will become evident that the 16 lead system may also be used. It will also be evident from the description that other signals such as those produced by heart sounds may also be recorded.

The embodiment of the apparatus now to be described is intended to record successively groups of three separate signals and with the standard twelve lead system the groups may be arranged as follows:

| Lead Group | 0 | 1 | 2 | 3 | 4 | 5 |
|---|---|---|---|---|---|---|
| Channel 1 | 0 | 1 | AVR | V1 | V4 | X |
| Channel 2 | 0 | 2 | AVL | V2 | V5 | Y |
| Channel 3 | 0 | 3 | AVF | V3 | V6 | Z |

In FIG. 1 the isolated input assembly 10 is enclosed by broken lines on the drawing and in normal practice is enclosed within a metalhousing to isolate the input assembly from stray fields. The twelve lead cable from the patient is illustrated diagramatically at 11 and is fed through a plurality of low pass filters 12 to remove radio frequencies, and then to a plurality of buffer amplifiers 13 having high input impedances and low output imedances. In the instant bodiment a total of fifteen amplifiers 13 are employed. The outputs of amplifiers 13 are fed to the lead forming network 14 and then to the lead switch 15 which selects the desired lead group and also produces 1 millivolt calibrating pulses. Three outputs from the lead switch 15 are then fed to the 50 KHz pulse width modulators 16a, 16b and 16c and their respective outputs are differentiated by isolating transformers 17a, 17b and 17c which feed the signals out of the isolated input assembly 10. Power, at a frequency of 25 KHz is supplied to the input assembly 10 through an iolation transformer 18, the secondary of the transformer feeding the power supply which feeds the ramp generator 19. The output power lead 19a is fed to the several components of the input assembly while the ramp generator output lead 19b is fed to the pulse width modulators 16a, 16b and 16c.

The output of the transformers 17a, b and c which consist of the modulated signals and calibrating pulses are fed to the demodulators 20a, 20b and 20c which demodulate the electrocardiograph signals. The ECG signals are then fed to the amplifers 21a, 21b and 21c which are capable of producing approximately 400 millivolts per centimeter of deflection on the ECG record to be described. A gain control or sensitivity switch 22 interconnected with the amplifiers 21a, 21b and 21c enables the gains of the amplifiers to be adjusted to 2, 5, 10 and 20 MM/MV on the record. As will be described, sensitivities of 5 MM/MV is also programmable in connection with lead groups 3 and 4. The output signals from the amplifiers 21a, b and c are then fed to signal distributors 22a, 22b and 22c each of which essentially comprises means for either feeding the signals to external equipment and/or the servo amplifiers 23a, 23b and 23c, the latter driving the pen motors 24a, 24b and 24c which in turn drive the pens 25a, 25b and 25c. The signal distributors also may accept external signals such as heart sounds which would then be fed to the servo amplifiers to be recorded.

Each of the pens 25a, b and c is provided with a conventional heat stylus which engages the heat responsive recording paper 26 driven by the motor 27 through the driver roller 28 and cooperating idler roller 29. The recorder further includes two fixed pens 30 and 31 each with a heated stylus for applying identifying marks to the recording paper. The pens are operated by relays 30' and 31' respectively to move them into and out of contact with the paper. Centering of the pens 25a, b and c is effected by the centering controls 32a, 32b and 32c connected with the servo amplifiers 23a, b and c. The servo amplifiers also include a frequency response control switch 33 to provide a standard ECG frequency response, an AHA response and a low frequency response wherein the high cutoff is below the cutoff for the standard response.

Power for the apparatus is provided by the power transformer 34 fed from a standard 50 to 60 Hz supply. The transformer has very low leakage and thus effectively isolates the equipment from the supply source. The power from transformer 34 is fed through a control switch 35 to the power supply 36 which provides DC on lead 37 and square wave power on lead 38. The DC lead 37 provides power for the components of the apparatus as required and the actual connections have not been shown to avoid undue complication of the drawing. It is well understood that the various electronic components such as the logic circuits, amplifiers etc. all require DC power in order to function. The square wave power lead 38 is connected to the chart drive speed and heat control 39 and via lead 40 to the transformer 18 forming part of the input assembly 10.

The apparatus is controlled by a switch panel 41 which includes illuminated lead group selector push buttons 42 through 47, operational mode push buttons 48 through 52 and function push buttons 53 through 56. The group selector buttons 42 through 47 are interconnected with the group selection logic circuit 57 which in turn is coupled through a plurality of isolating optoelectronic couplers 58 to the lead switch 15. With this arrangement the buttons 42 through 47 are used to select the particular lead group to be recorded when in the manual mode, and when in an automatic mode, the mode logic circuit 59 which is interconnected with the group selector 57 functions to automatically effect the recording of successive groups of leads. The group selector 57 also functions to illuminate the buttons 42 through 47 to indicate to the operator the specific lead group being recorded. This occurs in both the manual and automatic mode of operation. In addition, the 1MV calibration button 53 is connected to the group selector 57 and thence to the lead switch 15 to provide a calibration pulse when desired. Calibration pulses are also automatically inserted during automatic and semi-automatic operation of the apparatus.

The mode logic circuit 59 is also controlled by the function button 56 as will be described and is interconnected with the timer logic circuit 60 and controls the operation of the motor speed control 61 and the gain of amplifiers 21a, b and c for lead groups 3 and 4. The operational mode buttons 48 through 52, namely, stop, observe, manual, semi-automatic and automatic are connected to the mode logic circuit to effect the desired mode of operation. The mode circuit 59 also controls the servo amplifiers 23a, b and c as will be described.

The motor 27 is controlled by the motor speed control 61, the latter being connected with the mode logic circuit 59, which determines when the motor is to be operated, and to the chart drive speed control 39. The chart drive speed control may be manually adjusted to provide operating speeds of 25, 50, 75 and 100 MM/sec. The speed control 39 also provides energy through lead 62 and through vernier controls 63 and isolation transformers 64 for individually heating the stylus on each pen 25a, b and c, 30 and 31. In addition, the power fed to the styli is automatically varied with the recording speed in order to insure the production of an easily discernable record at all speeds. The mode logic circuit also controls the servo amplifiers 23a, b and c to effect automatic centering of the recording pens. In addition, precise speed control is effected by the tachometer 27' coupled with motor 27 and interconnected with the speed control 61. The speed control 61 in combination with the chart drive speed circuit 39 compares the tachometer output with a standard and continuously controls the motor speed to maintain constant chart speed.

Having described the apparatus, typical modes of operation will now be discussed in order to afford a clear understanding of the nature and function of each element and circuit of the apparatus. Details of the specific configurations of the various circuits such as amplifiers, logic circuits, speed control and the like have not been illustrated since such circuits can be readily constructed with knowledge of the functions they are to perform.

When power is applied to the apparatus by closure of switch 35 the instrument automatically shifts to the "stop" mode and button 48 on control panel 41 will be illuminated. Button 42 on panel 41 will also be illuminated indicating group 0. This occurs automatically regardless of the mode of operation or group being recorded at the time the apparatus was shut off. This control is effected by the group logic circuit 57 and mode logic circuit 59. At this time the chart drive motor 27 is not running and the speed at which it will run when energized is controlled by the chart drive speed control 39 as previously described. Standby heat is also applied to the stylus of each pen to preheat the styli without burning the recording paper 26. At the same time the logic mode circuit actuates FET "reset" switches, forming part of amplifiers 21a, b and c, which short the inputs of the amplifiers and thus clamp the pens 25a, b and c.

After the apparatus has been energized and the leads connected to the patient, the "observe" button 49 is depressed. This activates the amplifiers 21a, b, and c to effect movement of the styli. The paper drive motor is not operated and the patient signals can be observed, that is drift, noise, etc. These conditions can be observed for all lead groups by depressing the lead group buttons 43 through 47 successively.

For recording successive lead groups manually, the "manual" button 50 is depressed. This button is then automatically illuminated and the lights on all other operational mode buttons are extinguished. At the same time, the drive motor will run to drive the recording paper 26 and the styli will be heated to a temperature corresponding to the chart speed to record the signals on the three selected leads. The timer logic circuit 60 also operates to actuate the relay 31' and apply 1 second markers on the record. The relay 30' is also actuated to apply a code to the record to identify the specific lead group being recorded. For instance, lead group 1 is identified by one dot, lead group 2 by two dots, etc. and the code is repeated at intervals of approximately 2 seconds. To terminate operation in the manual or any other mode the "stop" button need only be depressed. The manual reset button 55 is used to stabilize the instrument and inactuate the pens to provide rapid recovery resulting from unwanted transients appearing at the input of the apparatus notwithstanding any operational mode.

The "semi-automatic" mode of operation provides for recording successive lead groups at the direction of the operator. In this mode the "semi-automatic" button 51 is depressed after the apparatus is placed in lead group 1 and observe mode. This will initiate reset and cause the lead selector 57 to select lead 0, illuminate button 42 and in cooperation with the mode logic circuit 59 start the chart drive motor. During the ensuing period of about 0.3 seconds a single 1MV calibration pulse is applied to all pens for about 0.1 second whereupon reset will again be initiated to clamp the pens during the transition to lead group 1 and mask any signals produced by the transition. At the end of the 0.3 second interval the recorder records the signals on lead group 1 for the selected time period which is usually 2.5 seconds. Upon completion of the recording of lead group 1 the drive motor stops, the light in the "semi-automatic" button 51 is extinguished, the observe light in button 49 is energized and the reset switches are activated to mask transition to lead group 2. The lead group switch automatically moves to "group 2 " and reset terminates and the instrument observes group 2. Pressing "semi-automatic" button 51 will repeat above recording group 2 and moving to group 3, etc.

The record, in addition to recording the three leads is also provided with time and identifying marks as discussed above. In application of the identifying marks in the semi-automatic and automatic modes of operation the long dash which will be discussed in connection with FIG. 2 is applied during the 0.3 second period used to apply the calibration pulse preceding a recording period and the dots are applied thereafter.

The automatic mode of operation is effected merely by depressing the "automatic" button 52. In the automatic mode the button 52 will be illuminated and the lead switch will switch to lead group 0 regardless of the prior lead group setting and the chart motor is started. After the initial reset, a 1MV calibration pulse is inserted and then during a following reset period the lead switch switches to lead group 1 and records it for a selected time. Thereafter the apparatus automatically switches to lead group 0 to repeat the reset-calibration-reset cycle and then record lead group 2. This action is then again repeated until all lead groups have been recorded. In the automatic mode all buttons 42 and 47 are inactivated to preclude manual interference with the sequence. It is also understood that during the automatic mode the time and identifying marks are applied. Furthermore, in many instances, lead group 5 is not required and therefore a switch is provided in the mode logic circuit 59 to eliminate group 5 in the automatic mode only. This switch does not prevent recording group 5 in the manual and simi-automatic modes.

In certain cases it is desirable to reduce the sensitivity of the channels when recording groups 3 and 4. For this purpose the ½ V button 56 is provided. When the button is depressed it will be illuminated and groups 3 and 4 will be automatically reduced in sensitivity in all three modes of operation. The "mark" button 54 is interconnected with the timing relay 30' through the signal distributor 22c and is used as an event marker when desired. The duration of the event mark is manually controlled and thus will always exceed the duration of the automatic time marks thereby avoiding confusion between the two.

FIG. 2 of the drawings illustrates more clearly the sequence of operations of the apparatus in accordance with the invention. Graph A illustrates the time sequence of automatic and semi-automatic modes of operation. The initial pulses 70 and 71 are clamping pulses to inactivate the pens during switching periods. During pulse 70 the apparatus is switched to lead group 0 and the pulse width is about 30 milliseconds. Activation of lead group 0 is effected by the pulses 72 and 73 of Graph B which are about ½ the duration of pulses 70 and 71 and occur at an interval of about 295 milliseconds. Thus, as will be observed in Graph C, the leads are switched to group 0 for about 0.3 seconds. The pulse 74 as shown on Graph D is initiated with the pulse 70 and upon its termination after approximately 120 milliseconds, the calibration pulse 75 (Graph E) is initiated and recorded on the record as shown in graphs M and N. It will also be observed that the reset periods are denoted by lines 70' and 71' applied to each channel during the occurrence of pulses 70 and 71 to identify the intervening calibration pulses 75. The leading edge of the first pulse 70 also starts the chart motor as shown in Graph J and continues throughout the operation in the automatic mode illustrated in FIG. 2.

The recording period for each group 1 through 4 or 5, as the case may be, is measured from the start of pulse 70 as shown in Graph F and continues until the next successive pulse 70. Thus lead group 1 is recorded as illustrated by Graph L which represents only channel 1 since the other channels 2 and 3 operate in the same manner and the recording occurs between the termination of pulse 71 and the start of the second pulse 70. Upon conclusion of the recording period for lead group 1, the apparatus is switched again to lead group 0, for calibration, by the second sets of pulses in graphs A and B, the second pulses of graphs C,D and E, whereupon lead group 2 is recorded during the time period shown in Graph G. The procedure is then again repeated for lead groups 3 and 4 as shown in graphs H and I. For simplification, lead group 5 has been omitted. Upon completion of the recording of lead group 4, termination of the chart drive is delayed for about 1 second as shown in Graph K to permit the recorded portions of the chart to be fed out of the recording apparatus.

Graph M illustrates the effect of the ½ V button 56 on groups 3 and 4. Operation of this button effects a reduction in sensitivity during the recording of those groups and it will be observed that the calibration pulses 75' are about ½ the magnitude of pulses 75.

The lead group identifying marks are shown in graph N. The long dash 76 is applied during each group 0 period and then one, two, three, four and five dots 77 are then applied to identify the groups being recorded.

While only one embodiment has been illustrated and described it is understood that changes, alterations and modifications may be made without departing from the true scope and spirit of the invention.

What is claimed:

1. Recording apparatus for electrocardiographic and other physiological signals comprising an input assembly having means for attachment of a multiplicity of conductors such as electrocardiographic leads from a patient, and means for forming said leads into a plurality of signal pairs with said pairs being arranged in sets of at least two lead groups and forming one lead group producing zero voltage, an electrical signal recorder having at least two recording pens for recording said sets of lead groups on a recording chart and a chart drive motor, amplifying means interconnected with each pen, lead group switching means including a plurality of switches in said input assembly for selectively switching each of said lead groups to said pens, logic control circuits including switching means therefore and control means interconnected with said lead group switching means and said logic control circuit for manually, semi-automatically and automatically interconnecting selected lead groups to said amplifiers.

2. Recording apparatus according to claim 1 wherein said lead group switching means includes means for generating calibrating pulses and means for selectively applying said pulses to said amplifiers upon recordation of each of said sets of lead groups.

3. Recording apparatus according to claim 2 wherein said imput assembly further includes at least two modulators interconnected with said lead group switching means, signal isolation transformers feeding modulated signals from said input assembly, a power isolation transformer providing operating power for the input assembly and means including a plurality of isolating optoelectronic couplers coupling said logic circuits to said lead group switching means whereby said input assembly is isolated from and electrically floating with respect to the remainder of said recording apparatus.

4. Recording apparatus according to claim 3 including at least two demodulators interconnecting said signal isolation transformers with said amplifiers and at least two servo amplifiers connected to the first said amplifiers and to said recording pens for operation of said pens.

5. Recording apparatus according to claim 4 including electrical clamping means interconnected with said amplifiers for clamping the inputs thereof to ground and connections between the last said means and said logic circuits, said logic circuits actuating said clamping means during operation of said lead group switching means to switch from one lead group to the next lead group.

6. Recording apparatus for electrocardiographic and other physiological signals comprising an input assembly having means for attachment of a multiplicity of conductors such as electrocardiographic leads from a patient, and means for forming said leads into a plurality of signal pairs with said pairs being arranged in sets of at least two lead groups and forming one lead group producing zero voltage, an electrical signal recorder having at least two recording pens for recording said acts of lead groups on a recording chart and a chart drive motor, amplifying means interconnected with each pen, lead group switching means in said input assembly for selectively switching each of said lead groups to said pens, logic control circuits interconnected with said switching means and control means interconnected with said logic control circuit for manually, semi-automatically and automatically interconnecting selected lead groups to said amplifiers, said lead group switching means including means for generating calibrating pulses and means for selectively applying said pulses to said amplifiers upon recordation of each of said sets of lead groups, said input assembly further including at least two modulators interconnected with said lead group switching means, signal isolation transformers feeding modulated signals from said input assembly, a power isolation transformer providing operating power for the input assembly, means including a plurality of isolating optoelectonic couplers coupling said logic circuits to said lead group switching means whereby said input assembly is isolated from and electrically floating with respect to the remainder of said recording apparatus, at least two demodulators interconnecting said signal isolation transformers with said amplifiers, at least two servo amplifiers connected to the first said amplifiers and to said recording pens for operation of said pens, electrical clamping means interconnected with said amplifiers for clamping the inputs thereof to ground and connections between the last said means and said logic circuits, said logic circuits actuating said clamping means during operation of said lead group switching means to switch from one lead group to the next lead group, said logic circuits further including means operable upon initiation of recording to operate said clamping means, actuate said switching means to switch to said zero voltage lead group, inactivate said clamping means, apply said calibrating pulse, reactivate said clamping means, switch to the lead group to be recorded, inactivate said clamping means to record the last said lead group and terminate said recording after a selected time interval.

7. Recording apparatus according to claim 6 including a chart drive motor control actuated by said logic circuits, means for applying time interval markers on said chart and means actuated by said logic circuits for applying marks on said chart identifying the specific lead group being recorded.

8. Recording apparatus according to claim 7 wherein said pens include heated stylii, said motor control includes means for preheating said stylii to a low temperature when said chart motor is not running and to a higher normal temperature when said motor is activated.

9. Recording apparatus for electrocardiographic and other physiological signals comprising an input assembly having means for attachment of a multiplicity of conductors such as electrocardiographic leads from a patient, and means for forming said leads into a plurality of signal pairs with said pairs being arranged in sets of at least two lead groups and forming one lead group producing zero voltage, an electrical signal recorder having at least two recording pens for recording said sets of leads group on a recording chart and a chart drive motor, amplifying means interconnected with each pen, lead group switching means in said input assembly for selectively switching each of said lead groups to said pens, logic control circuits interconnected with said switching means and control means interconnected with said logic control circuits for manually, semi-automatically and automatically interconnecting selected lead groups to said amplifiers, said input assembly including a lead forming network connecting said leads from the patient to said lead switching network, said lead forming network forming at least three sets of lead groups with each set consisting of at least two leads and one of said sets of lead groups producing producing zero voltage and the other of said sets of lead groups producing sets of voltages to be recorded, means interconnected with said logic circuits for electrically clamping said pens when said apparatus is switched from one set of lead groups to another set of lead groups, said lead group switching means further including means for producing calibrating pulses said logic circuits having means responsive to said control means to inactivate said clamping means to observe the motion of said pens when said chart drive motor is not running and upon operation of said control means to record a set of lead groups, said logic circuits activate the drive motor, clamp said pens, switch to said zero voltage lead groups set, unclamp said pens, apply said calibration pulses, again clamp said pens, switch to the selected set of voltage producing lead groups and then unclamp said pens to record the selected lead group.

10. Recording apparatus according to claim 9 including means in said logic circuits and lead switching circuits for automatically reducing the sensitivity of selected sets of lead groups.

11. Recording apparatus according to claim 10 including a chart drive motor control actuated by said logic circuits, means for applying time interval markers on said chart and means actuated by said logic circuits for applying marks on said chart identifying the specific lead groups being recorded.

12. Recording apparatus according to claim 11 wherein said pens include heated styli, said motor control includes means for preheating said styli to a low temperature when said chart motor is not running and to a higher normal temperature when said motor is activated.

13. Recording apparatus according to claim 10 wherein said input assembly further includes at least two modulators interconnected with said lead group switching means, signal isolation transformers feeding modulated signals from said input assembly, and a power isolation transformer providing operating power for the input assembly and means including a plurality of isolating optoelectronic couplers coupling said logic circuits to said lead group switching means whereby said input assembly is isolated from and electrically floating with respect to the remainder of said recording apparatus.

* * * * *